(12) United States Patent
Visconti et al.

(10) Patent No.: US 8,463,498 B2
(45) Date of Patent: Jun. 11, 2013

(54) METHOD FOR CONTROLLING THE SIDE SLIP ANGLE OF A REAR-WHEEL DRIVE VEHICLE WHEN TURNING

(75) Inventors: Amedeo Visconti, Turin (IT); Martino Cavanna, Vimercate (IT)

(73) Assignee: Ferrari S.p.A. (IT)

( * ) Notice: Subject to any disclaimer, the term of this patent is extended or adjusted under 35 U.S.C. 154(b) by 509 days.

(21) Appl. No.: 12/675,613

(22) PCT Filed: Aug. 28, 2008

(86) PCT No.: PCT/IB2008/002228
§ 371 (c)(1),
(2), (4) Date: Oct. 29, 2010

(87) PCT Pub. No.: WO2009/027801
PCT Pub. Date: Mar. 5, 2009

(65) Prior Publication Data
US 2011/0046849 A1    Feb. 24, 2011

(30) Foreign Application Priority Data

Aug. 31, 2007  (IT) .............................. BO2007A0598

(51) Int. Cl.
*B60L 3/00* (2006.01)
*B60K 28/16* (2006.01)

(52) U.S. Cl.
USPC ................. 701/41; 701/36; 701/45; 701/48; 701/70; 701/71; 701/72; 701/74; 701/77; 701/82; 701/84; 701/99; 701/101; 180/117; 180/170; 180/172; 180/97; 180/204; 180/6.2; 180/6.24; 180/271; 180/282

(58) Field of Classification Search
None
See application file for complete search history.

(56) References Cited

U.S. PATENT DOCUMENTS

| | | | | |
|---|---|---|---|---|
| 5,152,362 A | * | 10/1992 | Naito | 180/248 |
| 2002/0041124 A1 | * | 4/2002 | Nishio et al. | 303/167 |
| 2002/0161505 A1 | * | 10/2002 | Reich et al. | 701/72 |
| 2007/0032937 A1 | * | 2/2007 | Yamaguchi et al. | 701/70 |
| 2007/0158126 A1 | * | 7/2007 | Baldet | 180/249 |
| 2008/0142293 A1 | * | 6/2008 | Goto et al. | 180/446 |

FOREIGN PATENT DOCUMENTS

| | | |
|---|---|---|
| DE | 102004053785 A1 | 6/2005 |
| EP | 1632382 A2 | 3/2006 |

OTHER PUBLICATIONS

"International Application Serial No. PCT/IB2008/002228, International Search Report mailed Dec. 17, 2008", 4 pgs.
"International Application Serial No. PCT/IB2008/002228, Reply filed Jun. 29, 2009", 7 pgs.
"International Application Serial No. PCT/IB2008/002228, Written Opinion mailed Dec. 17, 2008", 7 pgs.

* cited by examiner

*Primary Examiner* — Jonathan M Dager
(74) *Attorney, Agent, or Firm* — Schwegman Lundberg & Woessner, P.A.

(57) ABSTRACT

A method for controlling the side slip angle of a rear-wheel drive vehicle when turning; the control method provides for the steps of: detecting the position of an accelerator control which is displaced along a predetermined stroke; using a first initial part of the stroke of the accelerator control for directly controlling the generation of the drive torque so that the generated drive torque depends on the position of the accelerator control; and using a second final part of the stroke of the accelerator control to directly control a side slip angle of the vehicle when turning so that the side slip angle depends on the position of the accelerator control.

20 Claims, 2 Drawing Sheets

METHOD FOR CONTROLLING THE SIDE SLIP ANGLE OF A REAR-WHEEL DRIVE VEHICLE WHEN TURNING

RELATED APPLICATIONS

This application is a nationalization under 35 U.S.C. 371 of PCT/IB2008/002228, filed Aug. 28, 2008 and published as WO 2009/027801 A1 on Mar. 5, 2009, which claimed priority under 35 U.S.C. 119 to Italian Patent Application Serial No. BO2007A000598, filed Aug. 31, 2007; which applications and publication are incorporated herein by reference and made a part hereof.

TECHNICAL FIELD

The present invention relates to a method for controlling the side slip angle of a rear-wheel drive vehicle when turning.

The present invention is advantageously applied in high-performance sports cars, to which explicit reference will be made in the following description, therefore without loosing in generality.

BACKGROUND

A modern, high-performance sports car has rear-wheel drive, because this solution is the most satisfying in terms of road performance and driving pleasure. Indeed, when turning, a rear-wheel drive car has an oversteering behaviour and therefore, by causing the slipping of the rear drive wheels when turning, allows to turn at a given side slip angle (i.e. with the car rotated towards the inside of the turn) and with the tyres which slide towards the outside of the turn. However, turning with the rear drive wheels slipping is a particularly complex manoeuvre, because the dynamic balance of the car is particularly unstable in this condition and may easily degenerate into a spin; therefore, such a driving maneuver, which is very spectacular and highly appreciated by drivers, is reserved to professional or semi-professional drivers.

DE102004053785A1 describes a control system of a rear-wheel drive vehicle when turning; the driver may pre-set a certain drift angle of the vehicle and, when turning, the control system directly and autonomously acts from the driver to impress the desired side slip angle to the vehicle. However, the control system suggested in DE102004053785A1 is not very practical, is not very satisfying and is potentially dangerous, because it does not allow the driver to maintain an instantaneous control of the side slip angle of the vehicle when turning.

EP1632382A2 discloses a vehicle stability control system with running resistance fluctuation compensation, in which a correction is carried out in order to suppress pitch variations, changes in wheel load or vibrations in vertical body motion.

OVERVIEW

Embodiments of the present subject matter provide a method for controlling the side slip angle of a rear-wheel drive vehicle when turning, which control method is free from the drawbacks described above, is at the same time easy and cost-effective to be implemented, and also allows a driver who is not particularly expert to turn safely with the rear wheel slipping.

According to some embodiments of the present subject matter, a method for controlling the side slip angle of a rear-wheel drive vehicle when turning is provided, as claimed in the appended claims.

BRIEF DESCRIPTION OF THE DRAWINGS

The present invention will now be described with reference to the accompanying drawings, which show a non-limitative embodiment thereof, in which.

DETAILED DESCRIPTION

Figure 1:
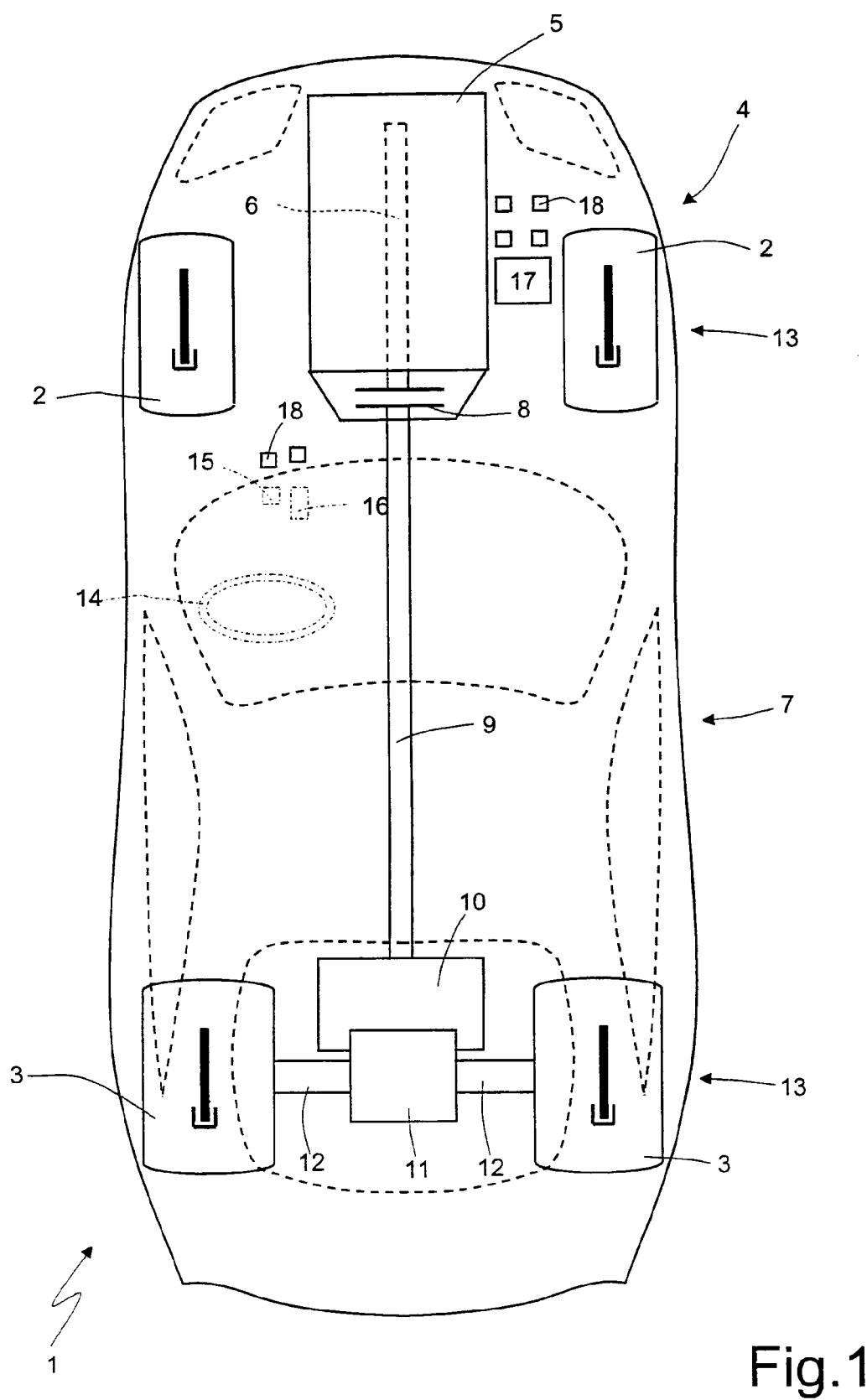
FIG. 1 shows a diagrammatic, plan view of a rear-wheel drive car implementing the control method disclosed herein.

In FIG. 1, numeral 1 indicates as a whole a car provided with two front wheels 2 and two rear drive wheels 3, which receive the drive torque Tm from an engine system 4.

The engine system 4 comprises an internal combustion thermal engine 5, which is arranged in a front position and is provided with a drive shaft 6, and a servo-controlled transmission 7, which transmits the drive torque Tm generated by the internal combustion engine 5 to the rear drive wheels 3 and comprises a servo-controlled clutch 8 accommodated in a bell integral with the internal combustion engine 5.

The clutch 8 is interposed between the drive shaft 6 and a propeller shaft 9 ending in a servo-controlled mechanical gearbox 10, which is arranged in a rear position and is provided with a primary shaft connected to the propeller shaft 9 and with a secondary shaft connected to a differential 11 from which a pair of drive axles 12 integral with the rear drive wheels 3 departs. The car 1 further comprises a braking system 13 (diagrammatically shown) comprising four disc brakes, each of which is coupled to a corresponding wheel 2 or 3.

A steering wheel 14, which is adapted to impart a steering angle to the front wheels 2 by means of a servo-assisted steering system, a brake control consisting of a brake pedal 15, which is adapted to control the braking system 13 to generate a braking torque on the wheels 2 and 3, and an accelerator control consisting of an accelerator pedal 16, which is adapted to adjust the drive torque Tm generated by the internal combustion engine 5 are present inside a passenger compartment of the car 1.

The car 1 further comprises an electronic control unit 17 (diagrammatically shown), which controls the engine system 4 and thus drives the internal combustion engine 5 and the servo-controlled transmission 7. The electronic control unit 17 is connected to a series of sensors 18, which are distributed inside the car 1 and are adapted to detect respective parameters of the car 1 in real time, such as for example the forward speed of the car 1, the steering angle of the car 1, the yaw speed of the car 1, the side acceleration of the car 1, the longitudinal acceleration of the car 1, the rotation speed of each rear drive wheel 3, the position of the accelerator pedal 16, the position of the brake pedal 15, the drive torque Tm generated by the internal combustion engine 5 and the side slip angle β of the car 1, i.e. the angle existing between the forward direction of the car 1 and the longitudinal axis of the car 1 itself. It is apparent that the electronic control unit 17 may consist of several physically separate processing units reciprocally connected, for example, by a data BUS; moreover, in order to detect one or more parameters of the car 1, an estimator algorithm implemented by the electronic control unit 17 itself may be used instead of a physical sensor 18.

The electronic control unit 17 usually detects the position of the accelerator pedal 16 which is displaced along a predetermined stroke and uses the position of the accelerator pedal 16 to directly control the generation of the drive torque Tm so that the drive torque Tm is generated according to the position of the accelerator pedal 16. In other words, the electronic control unit 17 determines the desired drive torque Tm according to the position of the accelerator pedal 16 and thus drives the internal combustion engine 5 to make the internal combustion engine 5 generate the desired drive torque Tm.

Figure 2:
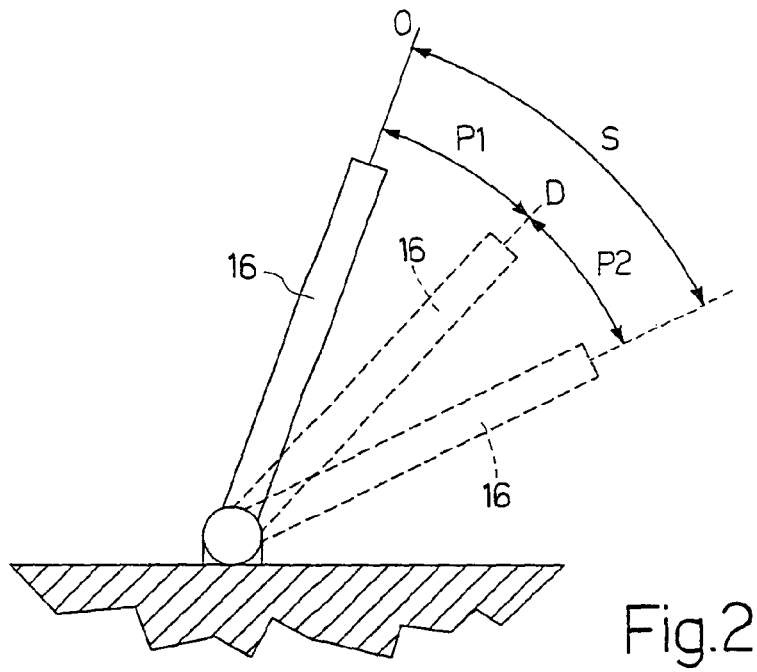
FIG. 2 shows a diagrammatic, side view of an accelerator pedal of the car in FIG. 1.
Figure 3:
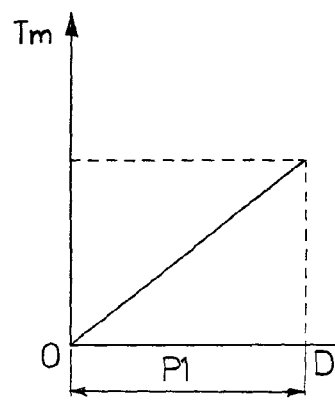
FIGS. 3 and 4 show two diagrams related to the control of the drive torque and of the side slip angle according to the position of the accelerator pedal in FIG. 2.

When turning (the turn is detectable, for example, according to the angular position of the steering wheel 14), the electronic control unit 17 uses the position of the accelerator pedal 16 in a different manner; specifically, as shown in FIG. 2, when turning, the electronic control unit 17 divides the stroke S of the accelerator pedal 16 into a first initial part P1 and a second final part P2, reciprocally divided by a delimitation point D. As shown in FIG. 3, when the accelerator pedal 16 is in the first initial part P1 of the stroke S, the electronic control unit 17 uses the position of the accelerator pedal 16 to directly control the generation of the drive torque Tm so that the generated drive torque Tm depends on the position of the accelerator pedal 16; instead, as shown in FIG. 4 when the accelerator pedal 16 is in the second final part P2 of the stroke S, the electronic control unit 17 uses the position of the accelerator pedal 16 to directly control a side slip angle $\beta$ of the car 1 when turning, so that the side slip angle $\beta$ depends on the position of the accelerator pedal 16.

Figure 4:
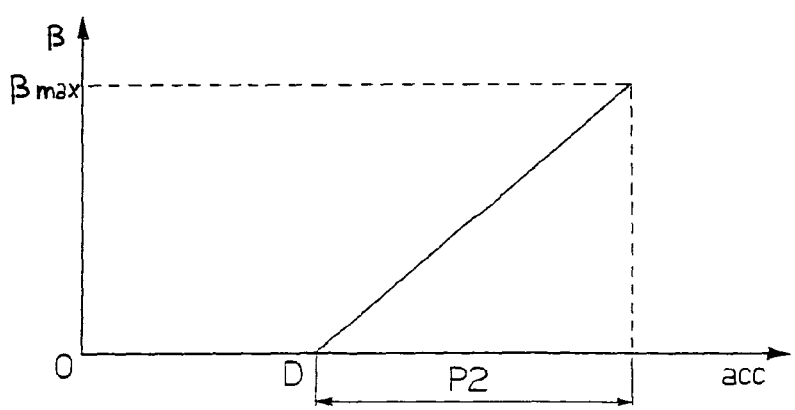

It is worth noting that by way of example in FIGS. 3 and 4, the laws which bind the position of the accelerator pedal 16 to the drive torque Tm (first initial part P1 of the stroke S) and to the side slip angle $\beta$ (second final part P2 of the stroke S) are linear and directly proportional. Obviously, the laws which bind the position of the accelerator pedal 16 to the drive torque Tm and to the side slip angle $\beta$ might be of any type (e.g. parabolic); furthermore, the laws which bind the position of the accelerator pedal 16 to the drive torque Tm and to the side slip angle $\beta$ might be set by the driver according to his or her driving skills (e.g. by means of an appropriate switch) or might be automatically set by the electronic control unit 17 according to the driver's psychophysical state, for example.

The delimitation point D between the first part P1 and the second part P2 of the stroke S of the accelerator pedal 16 is variable through each turn made by the car 1; in other words, the delimitation point D between the first part P1 and the second part P2 of the stroke S of the accelerator pedal 16 is not fixed and predetermined, but is determined each time through each turn.

For each turn made by the car 1, the delimitation point D between the first part P1 and the second part P2 of the stroke S of the accelerator pedal 16 coincides with the point at which a longitudinal sliding (slipping) of the rear drive wheels 3 occurs, or, alternatively, coincides with the point at which a significant side slip angle $\beta$ (i.e. higher than a predetermined threshold value) of the car 1 starts occurring. From the above, it is apparent that the position of the delimitation point between the first part P1 and the second part P2 of the stroke S of the accelerator pedal 16 is not detected at all turns made by the car 1; indeed, the position of the delimitation point D is determined only if the driver causes a longitudinal sliding (slipping) of the rear drive wheels 3 and/or an significant side slip angle $\beta$ of the car 1.

It is worth noting that, when turning, the longitudinal sliding (slipping) of the rear drive wheels and the side slip angle $\beta$ of the car 1 are bound; indeed when turning, the occurrence of a longitudinal sliding (slipping) of the rear drive wheels 3 implies that the car 1 has a certain non-null side slip angle $\beta$.

The side force generated by the tyres 2 and 3 of the car 1 initially increases with the increase of the side slip angle $\beta$ (beyond a certain side slip angle $\beta$, the side force generated by the tyres 2 and 3 of the car 1 decreases with the increase of the side slip angle $\beta$) and always decreases with the increase of the longitudinal sliding (slipping). When turning, the side force that the tyres 2 and 3 of the car 1 must generate essentially depends on the turning radius and on the travelling speed; therefore, a same side force of the tyres 2 and 3 may be either generated with null longitudinal sliding (slipping) and null side slip angle $\beta$ or may be generated with a (relatively) high longitudinal sliding (slipping) and therefore a corresponding (relatively) high side slip angle $\beta$.

According to an embodiment, when the accelerator pedal 16 is in the second final part P2 of its stroke S, the electronic control unit 17 detects the position of the accelerator pedal 16, determines a desired side slip angle $\beta$ according to the position of the accelerator pedal 16 along the second final part P2 of the stroke S, and drives the generation of the drive torque Tm for imparting the desired side slip angle $\beta$ to the car 1 when turning. For example, the electronic control unit 17 might determine a desired longitudinal sliding of the rear drive wheels 3 according to the desired side slip angle $\beta$ and might thus drive the generation of the drive torque Tm for imparting the desired longitudinal sliding to the rear drive wheels 3 when turning.

According to an embodiment shown in FIG. 4, the electronic control unit 17 determines a maximum drift angle $\beta$max when turning to avoid the control loss of the car 1 (obviously with an adequate safety margin) and thus makes a null side slip angle $\beta$ correspond to the initial portion of the second part P2 of the stroke S of the accelerator pedal 16 and makes the maximum drift angle $\beta$max correspond to the final point of the second part P2 of the stroke S of the accelerator pedal 16.

According to an embodiment, when turning with a non-null side slip angle $\beta$, the electronic control unit 17 determines an optimal steering angle and acts on the steering wheel 14 of the car 1 to indicate the optimal steering angle position to the driver. Such an indication of the optimal steering position might occur by making the steering wheel 14 vibrate when the actual steering angle is (significantly) different from the optimal steering angle. Alternatively, or in combination, such an indication of the position of the optimal steering angle might occur by modifying the interlocking curve of the steering system for creating a minimum point of the force required for rotating the steering wheel 14 at the optimal steering angle; in this manner, the driver would naturally be guided towards the optimal steering angle and would need to exert a high force to maintain the steering wheel 14 in a significantly different position from the optimal steering angle.

In the embodiment shown in the accompanying drawings, the control method of the side slip angle is applied to a car provided with four wheels in which the accelerator control consists of an accelerator pedal 16; it is worth underlining that according to a different embodiment, the method for controlling the side slip angle might be applied to a motorcycle provided with two or three wheels (typically two front wheels and one rear wheel) in which the accelerator control consists of an accelerator handle. Therefore, in general, the side slip control method described above may be applied to any type of rear-wheel drive vehicle provided with an accelerator control.

The above-described control method has many advantages, because it is simple and intuitive to be used for any driver; indeed, the driver only needs to continue to operate the usual controls (accelerator pedal 16 and steering wheel 14) in the usual manner to be able to safely obtain a non-null side slip angle $\beta$. In other words, when turning, the driver only needs to continue to press the accelerator pedal 16 so that a side slip angle β occurs and the amplitude of the side slip angle β may be adjusted by means of the accelerator pedal 16 as in a current sports car 1 without traction control; the fundamental difference as compared to a standard car 1 is that the accelerator pedal 16 no longer controls the generation of drive torque Tm, but directly controls the amplitude of the side slip angle β between a null value and a maximum value which still ensures the control of the car 1. Therefore, even if the driver presses down the accelerator pedal 16 (i.e. takes the accelerator pedal 16 to the stroke end), the electronic control unit 17 maintains the side slip angle β within the maximum value which still ensures the control of the car 1; the same maneuver (pressing down the accelerator pedal 16) in a current sports car without traction control would certainly cause the control loss of the car 1 and thus its spin off the road.

It is worth underlining that according to the above-described control method the driver maintains the full control of the dynamics of the car 1 at all times, being able to decide to either increase the side slip angle β by further pressing the accelerator pedal 16 or to decrease/cancel the side slip angle β by releasing the accelerator pedal 16. Moreover, such a full control is obtained by means of intuitive, natural controls (pressing and releasing the accelerator pedal 16) which are imparted instinctively without a need of particular training.

The invention claimed is:

1. A method for controlling the side slip angle (β) of a rear-wheel drive vehicle when turning; the method comprising:
    detecting the position of an accelerator control which is displaced along a predetermined stroke (S); and
    using a first initial part (P1) of the stroke (S) of the accelerator control for directly controlling the generation of the drive torque (Tm) so that the generated drive torque (Tm) depends on the position of the accelerator control;
    determining a delimitation point (D) between the first part (P1) and a second final part (P2) of the stroke (S) of the accelerator control for using the second final part (P2) to directly control a side slip angle (β) of the vehicle when turning so that the side slip angle (β) depends on the position of the accelerator control;
    determining a maximum side slip angle (βmax) when turning to avoid the control loss of the vehicle;
    detecting the position of the accelerator control along the second final part of the stroke (S);
    determining a desired side slip angle (β) according to the position of the accelerator control along the second final part (P2) of the stroke (S) so that the desired side slip angle (β) is not greater than the maximum side slip angle (βmax); and
    driving the generation of drive torque (Tm) to impart the desired side slip angle (β) to the vehicle when turning.

2. A method according to claim 1, wherein the delimitation point (D) between the first part (P1) and the second part (P2) of the stroke (S) of the accelerator control is variable at every turn made by the vehicle.

3. A method according to claim 2, wherein for each turn made by the vehicle the delimitation point (D) between the first part (P1) and the second part (P2) of the stroke (S) of the accelerator control coincides with the point at which a longitudinal sliding of the rear drive wheels starts occurring.

4. A method according to claim 2, wherein for each turn made by the vehicle the delimitation point (D) between the first part (P1) and the second part (P2) of the stroke (S) of the accelerator control coincides with the point at which a side slip (β) of the vehicle starts occurring.

5. A method according to claim 1, comprising:
    determining a desired longitudinal sliding of the rear drive wheels according to the desired side slip angle (β); and
    driving the generation of drive torque (Tm) to impart the desired longitudinal sliding to the rear drive wheels when turning.

6. A method according to claim 1, comprising:
    making a null side slip angle (β) correspond to the initial point of the second part (P2) of the stroke (S) of the accelerator control; and
    making the maximum side slip angle (βmax) correspond to the final point of the second part (P2) of the stroke (S) of the accelerator control.

7. A method according to claim 1, comprising:
    determining an optimal steering angle when turning with a non-null side slip angle (β); and
    acting on a steering wheel of the vehicle to indicate the position of the optimal steering angle to the driver.

8. A method according to claim 7, wherein the step of acting on a steering wheel of the vehicle for indicating the position of the optimal steering angle to the driver comprises making the steering wheel vibrate when the actual steering angle is different from the optimal steering angle.

9. A method according to claim 7, wherein the step of acting on a steering wheel of the vehicle to indicate the position of the optimal steering angle to the driver comprises modifying the interlocking curve of the steering system to create a minimum point of the force required to rotate the steering wheel at the optimal steering angle.

10. A method according to claim 2, comprising:
    determining a desired longitudinal sliding of the rear drive wheels according to the desired side slip angle (β); and
    driving the generation of drive torque (Tm) to impart the desired longitudinal sliding to the rear drive wheels when turning.

11. A method according to claim 3, comprising:
    determining a desired longitudinal sliding of the rear drive wheels according to the desired side slip angle (β); and
    driving the generation of drive torque (Tm) to impart the desired longitudinal sliding to the rear drive wheels when turning.

12. A method according to claim 4, comprising:
    determining a desired longitudinal sliding of the rear drive wheels according to the desired side slip angle (β); and
    driving the generation of drive torque (Tm) to impart the desired longitudinal sliding to the rear drive wheels when turning.

13. A method according to claim 2, comprising:
    making a null side slip angle (β) correspond to the initial point of the second part (P2) of the stroke (S) of the accelerator control; and
    making the maximum side slip angle (βmax) correspond to the final point of the second part (P2) of the stroke (S) of the accelerator control.

14. A method according to claim 3, comprising:
    making a null side slip angle (β) correspond to the initial point of the second part (P2) of the stroke (S) of the accelerator control; and
    making the maximum side slip angle (βmax) correspond to the final point of the second part (P2) of the stroke (S) of the accelerator control.

15. A method according to claim 4, comprising:
    making a null side slip angle (β) correspond to the initial point of the second part (P2) of the stroke (S) of the accelerator control; and
    making the maximum side slip angle (βmax) correspond to the final point of the second part (P2) of the stroke (S) of the accelerator control.

16. A method according to claim 5, comprising:
making a null side slip angle (β) correspond to the initial point of the second part (P2) of the stroke (S) of the accelerator control; and
making the maximum side slip angle (βmax) correspond to the final point of the second part (P2) of the stroke (S) of the accelerator control.

17. A method according to claim 2, comprising:
determining an optimal steering angle when turning with a non-null side slip angle (β); and
acting on a steering wheel of the vehicle to indicate the position of the optimal steering angle to the driver.

18. A method according to claim 3, comprising:
determining an optimal steering angle when turning with a non-null side slip angle (β); and
acting on a steering wheel of the vehicle to indicate the position of the optimal steering angle to the driver.

19. A method according to claim 4, comprising:
determining an optimal steering angle when turning with a non-null side slip angle (β); and
acting on a steering wheel of the vehicle to indicate the position of the optimal steering angle to the driver.

20. A method according to claims 8, wherein the step of acting on a steering wheel of the vehicle to indicate the position of the optimal steering angle to the driver comprises modifying the interlocking curve of the steering system to create a minimum point of the force required to rotate the steering wheel at the optimal steering angle.

* * * * *